(12) United States Patent
Oshry et al.

(10) Patent No.: US 10,762,522 B2
(45) Date of Patent: Sep. 1, 2020

(54) LOYALTY PROGRAM ENROLLMENT FACILITATION

(71) Applicant: MasterCard International Incorpaorated, Purchase, NY (US)

(72) Inventors: Steven Oshry, Tarrytown, NY (US); Michael T. McNamara, New York, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 279 days.

(21) Appl. No.: 15/378,339

(22) Filed: Dec. 14, 2016

(65) Prior Publication Data

US 2018/0165703 A1 Jun. 14, 2018

(51) Int. Cl.

| | | |
|---|---|---|
| *G06Q 30/02* | (2012.01) | |
| *G06Q 20/36* | (2012.01) | |
| *G06Q 20/40* | (2012.01) | |
| *G06Q 20/20* | (2012.01) | |
| *G06Q 20/38* | (2012.01) | |

(Continued)

(52) U.S. Cl.
CPC ......... *G06Q 30/0227* (2013.01); *G06Q 20/10* (2013.01); *G06Q 20/202* (2013.01); *G06Q 20/204* (2013.01); *G06Q 20/3223* (2013.01); *G06Q 20/3674* (2013.01); *G06Q 20/387* (2013.01); *G06Q 20/401* (2013.01); *G06Q 20/4012* (2013.01)

(58) Field of Classification Search
CPC ............. G06Q 30/0227; G06Q 20/401; G06Q 20/3674; G06Q 20/4012
See application file for complete search history.

(56) References Cited

U.S. PATENT DOCUMENTS

| 9,251,372 B1* | 2/2016 | Lahoz | G06F 21/6245 |
| 2007/0022008 A1* | 1/2007 | Kingsborough | G06Q 20/10 |
| | | | 705/14.17 |

(Continued)

OTHER PUBLICATIONS

"MasterCard Introduces MasterPass—The Future of Digital Payments", Press Release, Barcelona. Feb. 25, 2013. (Year: 2013).*

(Continued)

*Primary Examiner* — William A Brandenburg

(74) *Attorney, Agent, or Firm* — Buckley, Maschoff & Talwalkar LLC

(57) ABSTRACT

Provided are a system and method for facilitating enrollment in a merchant loyalty program. In one example, the method includes receiving, from a merchant server, a request to enroll a digital wallet user in a merchant loyalty program, the request being input via a merchant website associated with the merchant server, verifying that the digital wallet user is an authorized user of the digital wallet via a window associated with the merchant website, and in response to verifying the digital wallet user is an authorized user, automatically transmitting previously stored information of the digital wallet to the merchant server for enrolling the digital wallet user in the merchant loyalty program. According to various aspects, secure data may be imported into a merchant loyalty program from a digital wallet account, thus simplifying the enrollment process on the user.

22 Claims, 6 Drawing Sheets

(51) Int. Cl.
G06Q 20/32 (2012.01)
G06Q 20/10 (2012.01)

(56) References Cited

U.S. PATENT DOCUMENTS

2011/0302016 A1* 12/2011 Haddad ................ G06Q 30/00
705/14.25
2013/0246261 A1* 9/2013 Purves ................ G06Q 20/105
705/41
2015/0254672 A1* 9/2015 Huesch ............. G06Q 20/4097
705/44

OTHER PUBLICATIONS

"MasterCard CEO: MasterPass Starts Where Apple Pay Stops", by PYMNTS. Oct. 31, 2014. (Year: 2014).*
"MasterCard's digital wallet strategy takes a big step forward with MasterPass", by James Wester. Mobile Payments Today. Feb. 25, 2013. (Year: 2013).*

* cited by examiner

FIG. 2
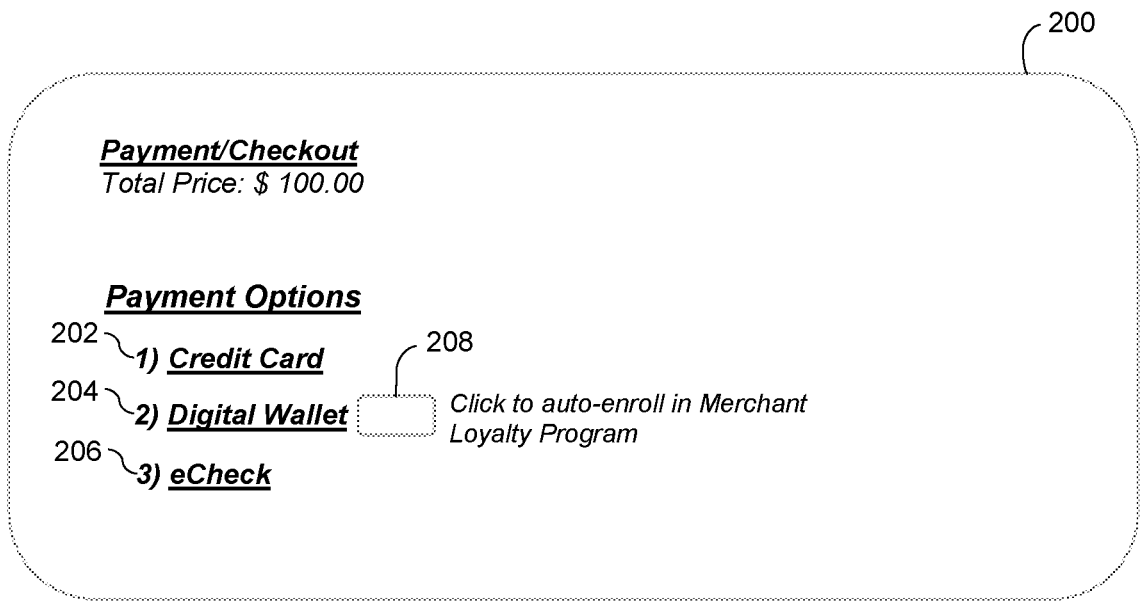
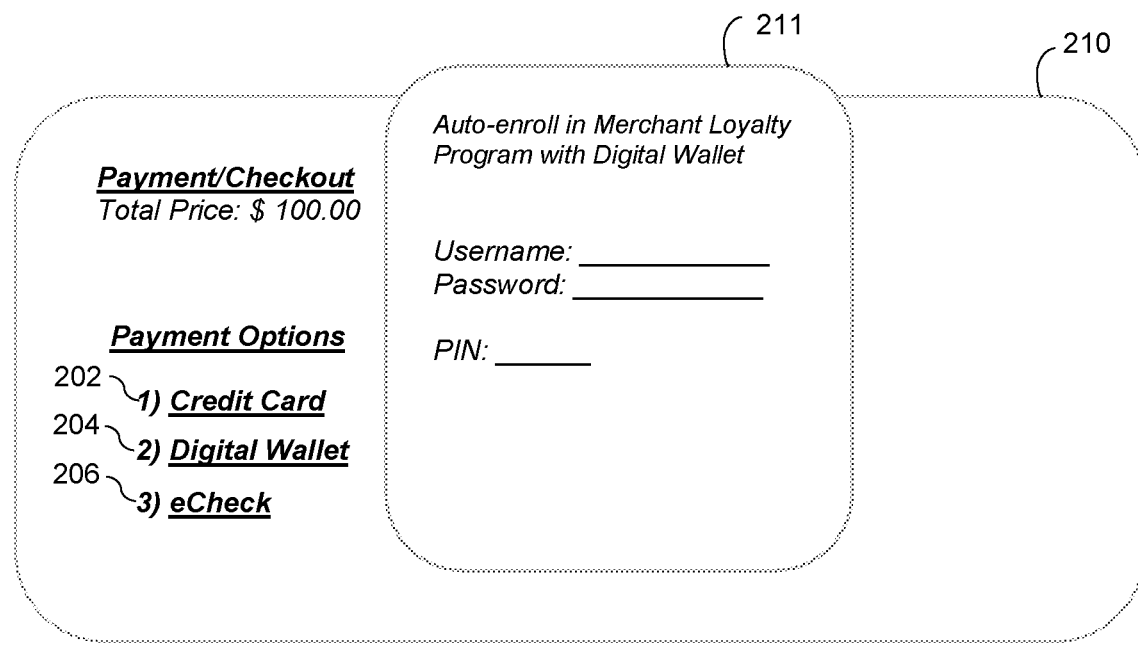

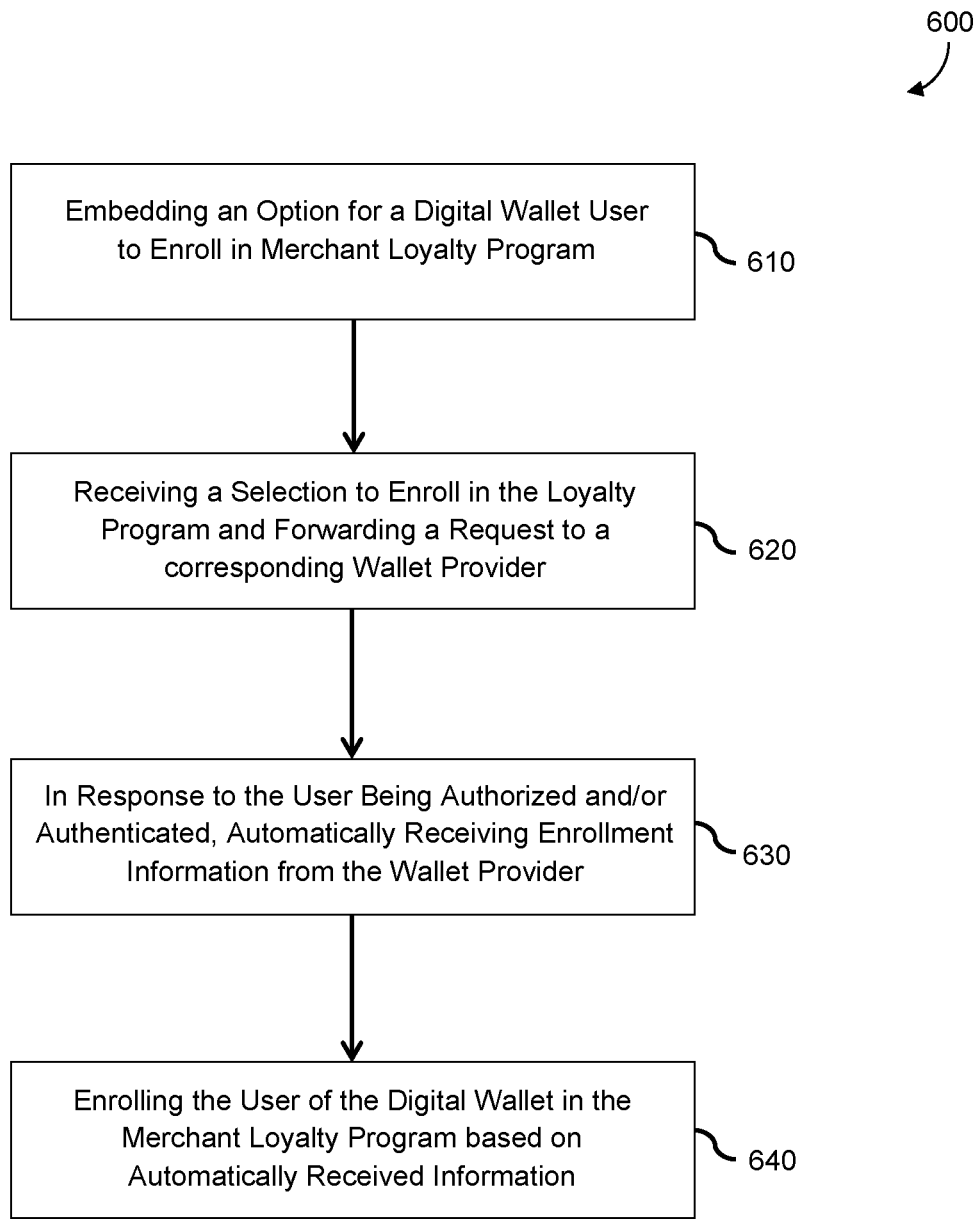

LOYALTY PROGRAM ENROLLMENT FACILITATION

FIELD

Exemplary embodiments described herein relate generally to cardholder transactions and, more particularly, to systems and methods for facilitating cardholder enrollment in merchant loyalty programs.

BACKGROUND

Existing clients are the livelihood of any merchant business. Establishing an authentic bond to ensure re-occurring business ensures future sales for the business. However, just providing regular newsletters, "teaser" rates, discount programs, and the like, is no longer enough. It is common for a business to lose a significant portion of their client base, per year, and at the same time it is becoming more difficult to acquire new customers. In an effort to improve customer loyalty, merchants are now offering loyalty programs. A loyalty program, also referred to as rewards program, points program, and the like, may be offered to encourage customers to continue to make purchases of products and services. For example, a loyalty program can reward a customer based on their spending behavior and encourage more spending by providing the customer with free merchandise, coupons, advanced releases of products, and the like. Loyalty programs can be found in all major shopping industries including supermarkets, pharmacies, hotels, airlines, credit cards, gasoline, and many other merchants.

Merchants are always trying to create more roads into their loyalty programs because loyalty programs create product awareness and help keep an active line of communication with existing clients. However, one of the biggest hurdles that a merchant has in enrolling new users their loyalty program is the amount of time and effort it takes user to sign up for a loyalty program. For example, the enrollment process can require a person to enter a significant amount of information, some of which is not readily available without the person spending time and effort. As a result, the registration process can create a barrier that prevents customers from participating in loyalty programs.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings.

FIG. 2 is a diagram illustrating user interfaces of a merchant website providing an opportunity to enroll in a loyalty program in accordance with example embodiments.

FIG. 6 is a diagram illustrating a method for facilitating loyalty program enrollment in accordance with another example embodiment.

Figure 1:
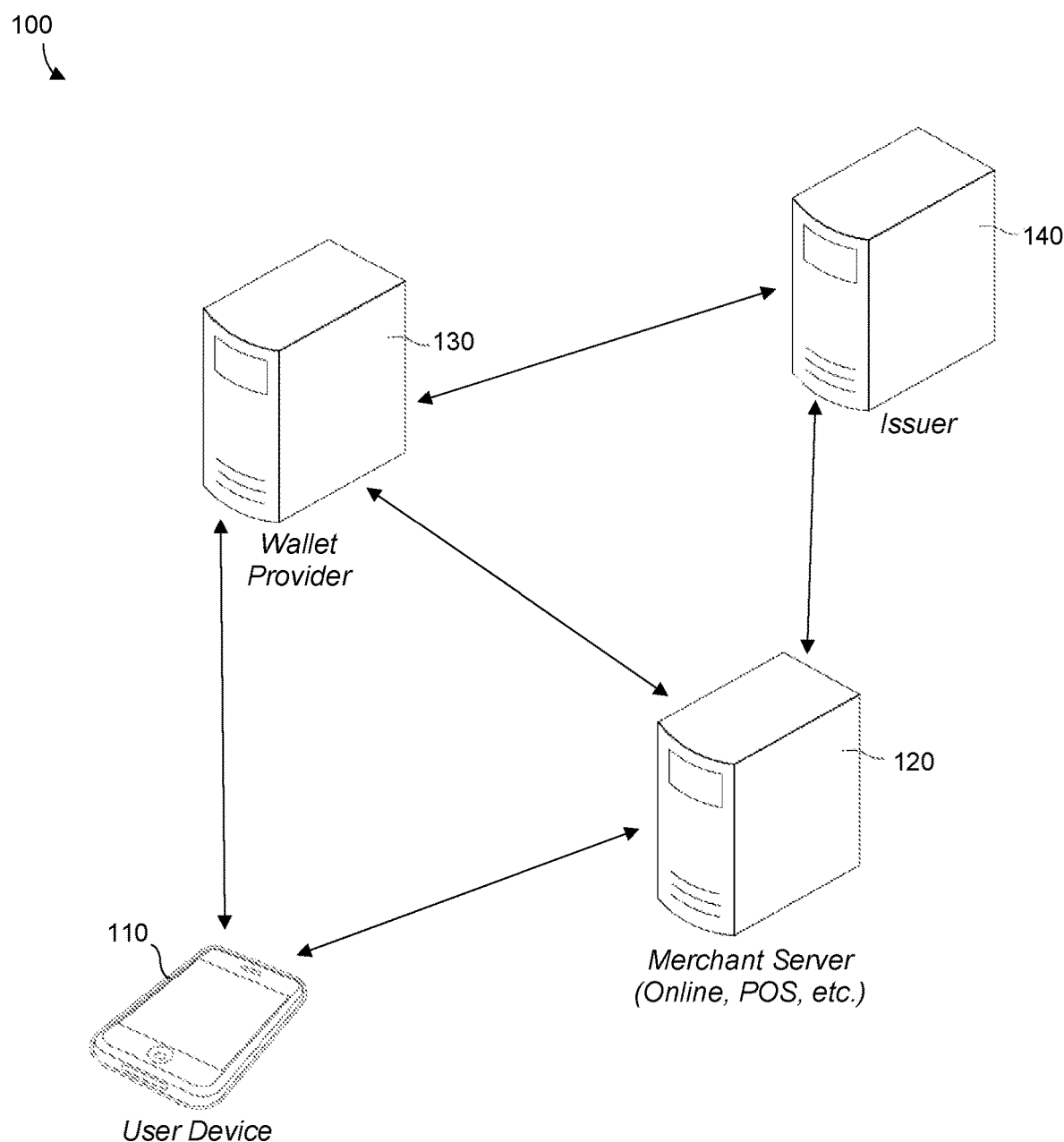
FIG. 1 is diagram illustrating a system for facilitating loyalty program enrollment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The exemplary embodiments described herein relate to a system and method for facilitating enrollment in a loyalty program. A loyalty program (e.g., merchant loyalty program) may reward consumer participants who register for the program based on their spending and other factors. Loyalty programs currently do not attract as many users as they would like. One of the biggest barriers preventing consumers from joining a loyalty program is that too much time and information is required of a consumer to sign up (i.e., enroll) for the loyalty program. Often, a loyalty program enrollment application can require just as much information as a credit card application. The example embodiments facilitate enrollment in a loyalty program by linking a cardholder's digital wallet to a merchant's loyalty program. For example, the merchant may electronically import secured sensitive data from a wallet provider server into a loyalty program enrollment server of the merchant. As a result, a digital wallet user can securely and easily register for a loyalty program by a simple click of a button without filling out forms or tracking down information.

Digital wallets are becoming more popular for settling payment transactions rather than traditional payment cards because they do not require a physical card and they also provide additional layers of security. A digital wallet may be stored on an electronic device such as a computer, laptop, tablet, smart phone, and the like. Examples of a digital wallet include MasterCard MasterPass, Apple Pay, Google Wallet, and many others. Digital wallets can be used in-store and online and typically require authentication/authorization of the digital wallet user at the time of purchase such as a username, password, PIN, biometric information, and the like. During enrollment, digital wallets require a user to provide sensitive information such as personal information, contact information, financial information, and the like. In most cases, a person has to enter the same amount of information to sign up for a digital wallet as is needed to sign up for a loyalty program. As a result, a significant portion if not all of the information that is needed to sign up for a merchant loyalty program is already securely stored by a digital wallet provider.

A cardholder who owns a digital wallet may checkout online through a merchant website or in-store through a merchant point-of-sale (POS) terminal or kiosk using a payment account included in a digital wallet. In either scenario, the merchant can detect that the cardholder has a digital wallet stored on their device. Accordingly, the merchant can prompt the cardholder (e.g., button on the merchant website, checkbox on the POS terminal, etc.) for whether they would like to enroll in a merchant loyalty program based on sensitive data from the digital wallet. In response to the cardholder selecting to enroll in the merchant loyalty program using the digital wallet, the merchant server can provide this information to a digital wallet provider (e.g., server) that controls the particular digital wallet. In some examples, the digital wallet provider may verify that the cardholder is an authorized user of the digital wallet and also authenticate the cardholder to determine that the cardholder is an authenticated user (i.e., the actual authorized user) of the digital wallet. Furthermore, in response to verifying/authenticating the digital wallet user, the digital wallet provider may automatically transmit secure information about the digital wallet user previously stored by the digital wallet provider to the merchant server. Accordingly, the merchant server can enroll the digital wallet user in the merchant loyalty program without requiring the digital wallet user to enter information or fill out a form in order to join the merchant loyalty program.

FIG. 1 illustrates a system 100 for facilitating loyalty program enrollment in accordance with an example embodiment. Referring to FIG. 1, the system 100 includes a user device 110, a merchant device 120, a wallet providing device 130, and an issuer 140. It should also be appreciated that additional devices not shown may be included in the system 100 such as a payment gateway, an acquirer, and any other devices. The devices within the system 100 may connect to one another via a wired or wireless connection through a network (e.g., Internet, private network, etc.), direction connection, and the like. In this example, it is assumed that user device 110 has a digital wallet installed therein that is hosted by wallet provider 130 (e.g., server). It is also assumed that the digital wallet includes at least one payment account therein (e.g., credit card, debit card, check card, etc.) that is issued by the issuer 140 (e.g., server) which may correspond to a bank, a credit agency, or other type of financial institution. Also, the user device 110 may include any device capable of using a digital wallet such as a mobile device, a computer, a laptop, a tablet, a mobile phone, a kiosk, an appliance, and the like.

According to various aspects, the user device 110 may attempt to use the payment account issued by issuer 140 and associated with a digital wallet provided by wallet provider 130 to settle a transaction with a merchant associated with merchant server 120 for the payment of items such as goods and/or services. Here, the user device 110 may be a mobile phone attempting to make payment in-store (i.e., through a POS terminal) or online through a merchant website. For example, the merchant server 120 may be an in-store computing device, workstation, server, etc., which is attached to a contactless reader POS terminal that detects the digital wallet/payment account stored on the user device 110 during a checkout process. As another example, the merchant server 120 may be a web server that detects the digital wallet/payment account during an online checkout process via a website associated with the merchant server 120. For example, during an online checkout, the merchant server 120 can detect (e.g., auto-detect) that a user is checking out with a payment account associated with a digital wallet or that a user has a digital wallet stored on their device and provide the user an opportunity to sign up for a merchant loyalty program using the digital wallet. As another example, the merchant server 120 can permanently embed an option to sign up for the loyalty program within the merchant website via a radio button, link, drop-down box, or the like, displayed on the merchant website. When the selection to enroll in the merchant loyalty program is received by the merchant server 120, the merchant server 120 can contact a corresponding wallet providing server (e.g., secure channel) of the respective digital wallet of the current user. According to various aspects, the merchant server 120 may be able to contact any number of different digital wallet providers and is not limited to a specific digital wallet provider.

The examples herein describe the user device 110 selecting the option to enroll in the merchant loyalty program during an online checkout process on a merchant website, however, it should be appreciated that the examples may be applied in-store, for example, through a POS terminal, or a computer/workstation of the merchant. As another example, the user does not need to select the option to enroll but instead the merchant server may automatically provide the user the option in response to detecting a digital wallet is present on the user device 110 or in response to the user attempting to pay for a transaction using the digital wallet. According to various embodiments, when a digital wallet user selects the option to enroll in the merchant loyalty program, the merchant server 120 can automatically retrieve secure cardholder information of the digital wallet (e.g., secure information of the user) from the wallet provider 130. Also, before the sensitive information is transmitted from the wallet provider 130 to the merchant server 120, an authorization process and/or an authentication process may be performed by the digital wallet provider 130 and/or the issuer 140 to authorize and/or authenticate the digital wallet user.

According to various aspects, the digital wallet provider 130 and/or the issuer 140 may perform an authorization/authentication process via a window displayed in association with the merchant website hosted by the merchant server 120. The window may be displayed on the user device 110 in association with a display of the merchant website (e.g., embedded within, overlaying, to the side, etc.). In one embodiment, the window may be a lightbox or an iframe that captures data directly from a user of the user device 110 and transmitted directly to the wallet provider 130 and/or the issuer 140 without passing through the merchant server 120. Accordingly, sensitive user information may be transmitted to the wallet provider 130 and the issuer 140 without being stored or received by the merchant server 120. For example, the user information used to authenticate the digital wallet user may include a username, password, security code, PIN, biometric information of the digital wallet user, and the like, which the user does not wish to share with the merchant.

Figure 3:
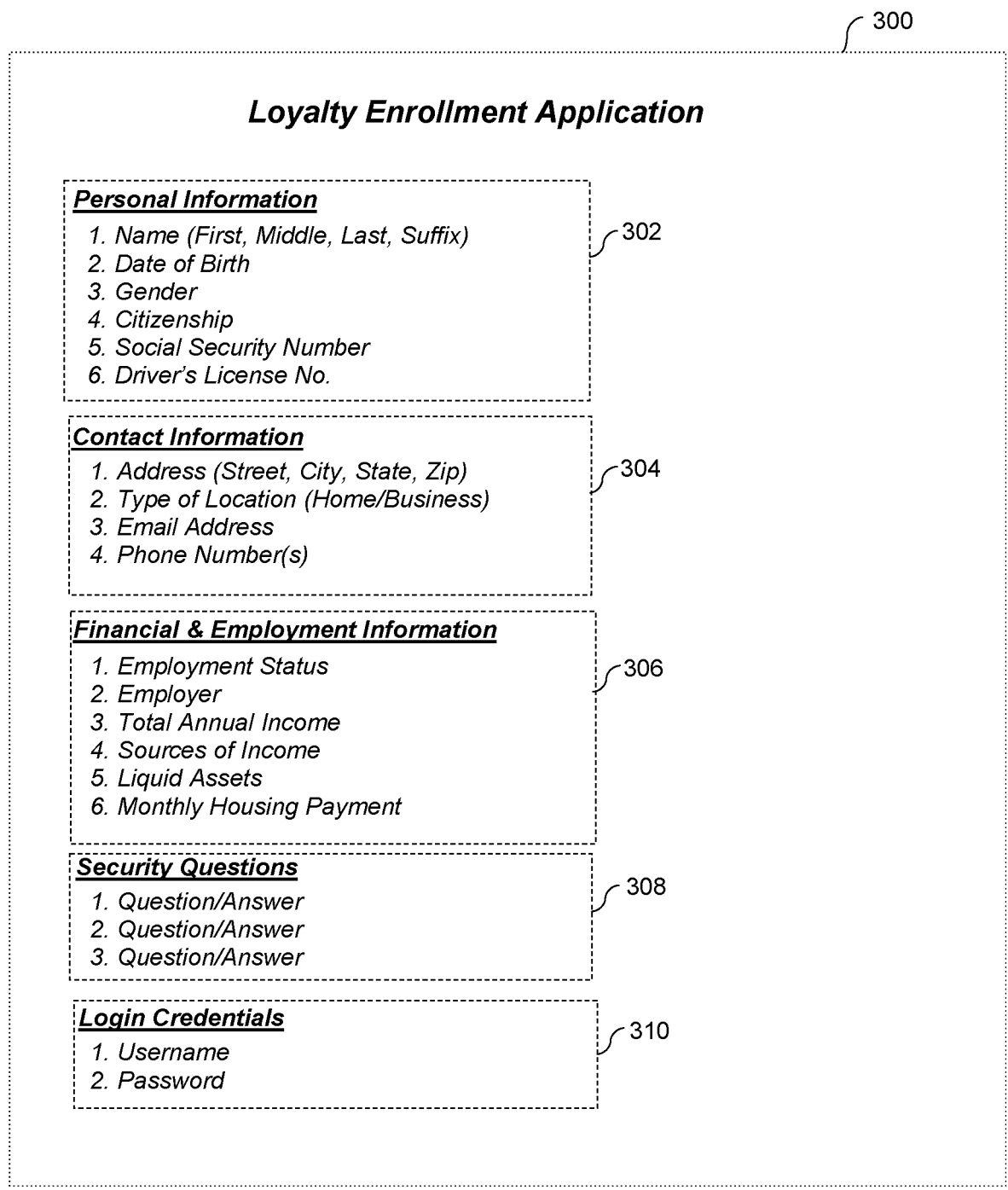
FIG. 3 is a diagram illustrating loyalty program enrollment information that may be automatically retrieved from a digital wallet provider, in accordance with an example embodiment.

In response to the digital wallet user of the user device 110 successfully being verified by an authorization/authentication process, the wallet provider 130 may automatically transmit/communicate with the merchant server 120 and provide the merchant server 120 with previously stored information about the digital wallet user of the user device 110 to enroll the user in a merchant loyalty program. For example, the wallet provider 130 and the merchant server 120 may communicate with each other via a secured communications channel. In some cases, the merchant server 120 may request specific information from the wallet provider 130. As another example, the wallet provider 130 may identify all information stored by the wallet provider 130 that is needed by the merchant server 120 to enroll a digital wallet user in the merchant loyalty program. An example of the information that may be provided from the wallet provider 130 to the merchant server 120 is shown in FIG. 3, which is further described below. Based on the information about the digital wallet user that is auto-received from the wallet provider 130, the merchant server 120 may enroll the digital wallet user of the user device 110 in the merchant loyalty program. In some cases, the wallet provider 130 may provide all of the information to the merchant server 120 that is needed to enroll the user in the merchant loyalty program. As another example, the wallet provider 130 may provide some information, and the remaining information may be input by the user (e.g., password, username, etc.).

In some examples, the user (e.g., cardholder, payee, digital wallet user, etc.) may be incentivized to sign up for the merchant loyalty program using the digital wallet. For example, the merchant server 120 may provide the user with an instant discount on a current purchase, or the like. Accordingly, the user may benefit from signing up for the merchant loyalty program. Also, the merchant would also benefit from the user signing up for the merchant loyalty program because the merchant loyalty program provides the merchant with a continued line of communication to customers and promotes brand awareness. Furthermore, the digital wallet provider benefits because the digital wallet is being used and also because of the enhanced value now provided to a user of the digital wallet.

According to various aspects, the only action necessary for a person to take to enroll in a merchant loyalty program is a simple click of a button, selection of a checkbox, or the like. The flow of the person's information would be between a digital wallet providing device (e.g., a repository) and the merchant server over a secure channel. In some examples, a successful authorization and/or authentication of the user may trigger the transfer of the user's information automatically to the merchant server without requiring the person to enter enrollment information or fill out a form.

FIG. 2 illustrates user interfaces of a merchant website providing a cardholder with an opportunity to enroll in a loyalty program in accordance with example embodiments. In this example, user interfaces 200 and 210 correspond to windows of a merchant website displayed on a screen of a user device (e.g., user device 110 shown in FIG. 1) where a user of the website has reached a checkout process. User interface 200 includes a checkout page having multiple different payment options including, but not limited to, credit card option 202, digital wallet option 204, and eCheck option 206. In addition, the user interface 200 includes a selection 208 that may be selected by a user of the merchant website to enroll in a merchant loyalty program of a merchant associated with the website using information from a user's digital wallet account. For example, the selection 208 may be a radio button, a checkbox, a drop-down menu, or any other option capable of being selected by a user. When the user selects the selection 208, the merchant server hosting the website may transmit an indication of the selection to a digital wallet provider of the digital wallet. In this example, the selection 208 is automatically shown on the website. Here, an authorization and/or an authentication process can be performed by the wallet provider (e.g., via a separate window, lightbox, etc.) after the user has decided to enroll in the merchant loyalty program.

Meanwhile, user interface 210 also shows a checkout page of the merchant website. In this example, the user may be required to enter their sign-in information of their digital wallet and sign into their digital wallet account before the merchant server makes visible and enables the user to select the selection 208. In this example, an authorization process can be performed by the digital wallet provider (e.g., wallet provider 130 shown in FIG. 1) to verify the user is an authorized user of the digital wallet. In association with user interface 210, the wallet provider generates and displays a window 211 such as a lightbox or an Iframe, over a display of the user interface 210. In particular, the window 211 is displayed as an overlay with respect to the user interface 210 and partially overlapping. However, the embodiments are not limited thereto. For example, the window 211 may partially overlap user interface 210, not overlap user interface 210, or be completely overlapping with user interface 210. The information that is input by the user into the window 211 may be captured by the wallet provider without passing through or being stored by the merchant server hosting the user interface 210.

FIG. 3 illustrates an example of loyalty program enrollment information 300 that may be automatically retrieved from a digital wallet provider, in accordance with an example embodiment. Referring to FIG. 3, the loyalty program enrollment information 300 may be previously stored by a wallet provider, and may be automatically transmitted by the wallet provider server to a merchant server. The information may include personal information 302 such as name, date of birth, gender, citizenship, social security number, driver's license number, and the like. The enrollment information may include contact information 304 such as residence information, email information, phone number information, and the like. The enrollment information may also include financial information 306 such as employer information, income information, credit information, housing information, and the like. The enrollment information may also include security questions and answers 308 previously provided to the wallet provider as well as login credentials 310 provided to the wallet provider. It should be appreciated that the enrollment information that may be provided to a merchant is not limited by what is shown and described with respect to FIG. 3, but may include any information that is used to enroll a user in a merchant loyalty program.

Figure 4:
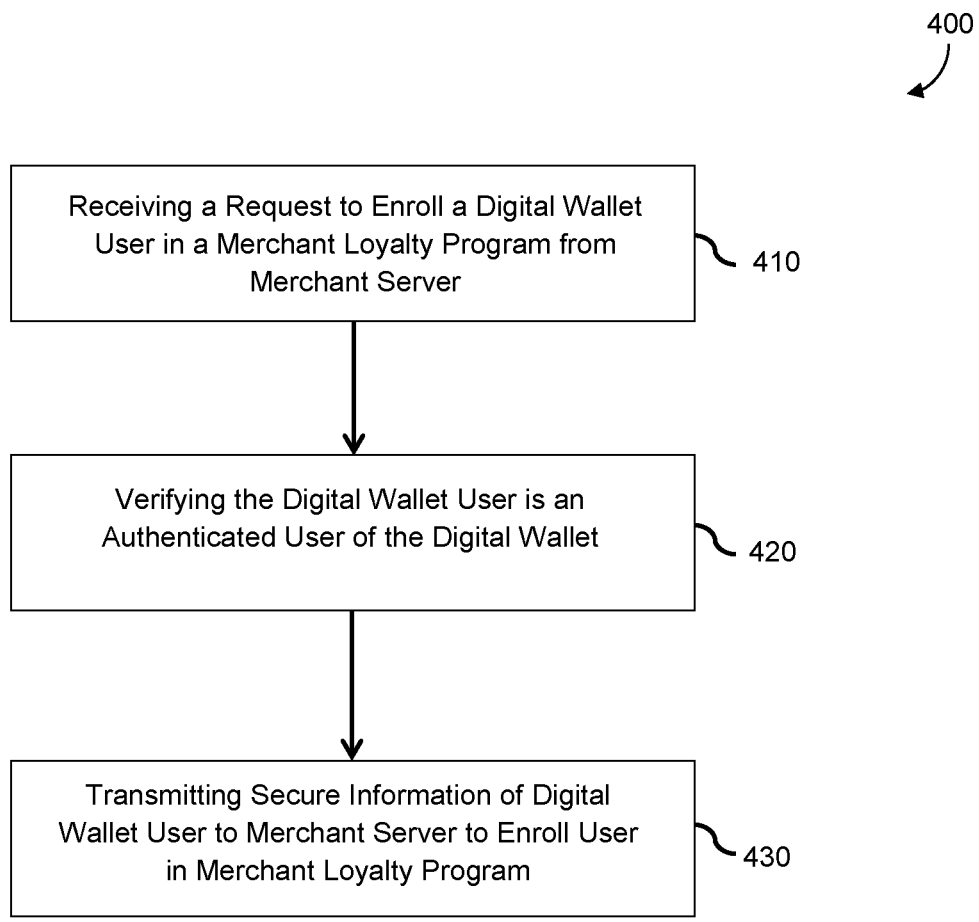
FIG. 4 is a diagram illustrating a method for facilitating loyalty program enrollment in accordance with an example embodiment.

FIG. 4 illustrates a method 400 for facilitating loyalty program enrollment in accordance with an example embodiment. For example, the method 400 may be performed by the wallet providing server 130 shown in FIG. 1. Referring to FIG. 4, in 410, the method includes receiving, from a merchant server, a request to enroll a digital wallet user in a merchant loyalty program. For example, the request may be input via a merchant website hosted by the merchant server. As another example, the request may be entered via a POS terminal externally connected to a merchant computing device in a merchant store. The request may indicate that the user has indicated they are a member of a digital wallet account hosted by the digital wallet providing server.

In 420, the digital wallet providing server may verify the digital wallet user requesting enrollment is an authorized user of the digital wallet via a window that is displayed by the digital wallet provider in association with the merchant website. For example, the window may be displayed as shown in the user interfaces of FIG. 2 and may include overlaying the window on top of a window displaying the merchant website. In this example, the window provided by the wallet provider may include one or more fields for inputting/receiving authorization and/or authentication information. Using the window, the user may input information and the wallet providing server may authorize and authenticate the user via one or more security protocols. For example, the authorization and authentication may include one or more of a password, username, account PIN number, biometric information of the digital wallet user, and the like.

In response to verifying the digital wallet user is an authorized user, in 430 the method automatically transmits previously stored information of the digital wallet account of the user to the merchant server for enrolling the digital wallet user in the merchant loyalty program. For example, the information for enrolling the digital wallet user in the merchant loyalty program may include the information shown in FIG. 3, or additional or different information. In some embodiments, the transmitting in 430 may include identifying all user information needed for enrollment in the merchant loyalty program that is already stored at the digital wallet providing server and automatically transmitting the identified information to the merchant server. As another example, the transmitting in 430 may include receiving a request for specific information about the digital wallet user from the merchant server. According to various embodiments, the previously stored secure information of the digital wallet that is transmitted to the merchant server may include personal information of the digital wallet user, financial information of the digital wallet user, contact information of the digital wallet user, and the like. In some examples, the secure information of the digital wallet user may be automatically transmitted over a secured channel between the merchant server and the digital wallet providing server.

Figure 5:
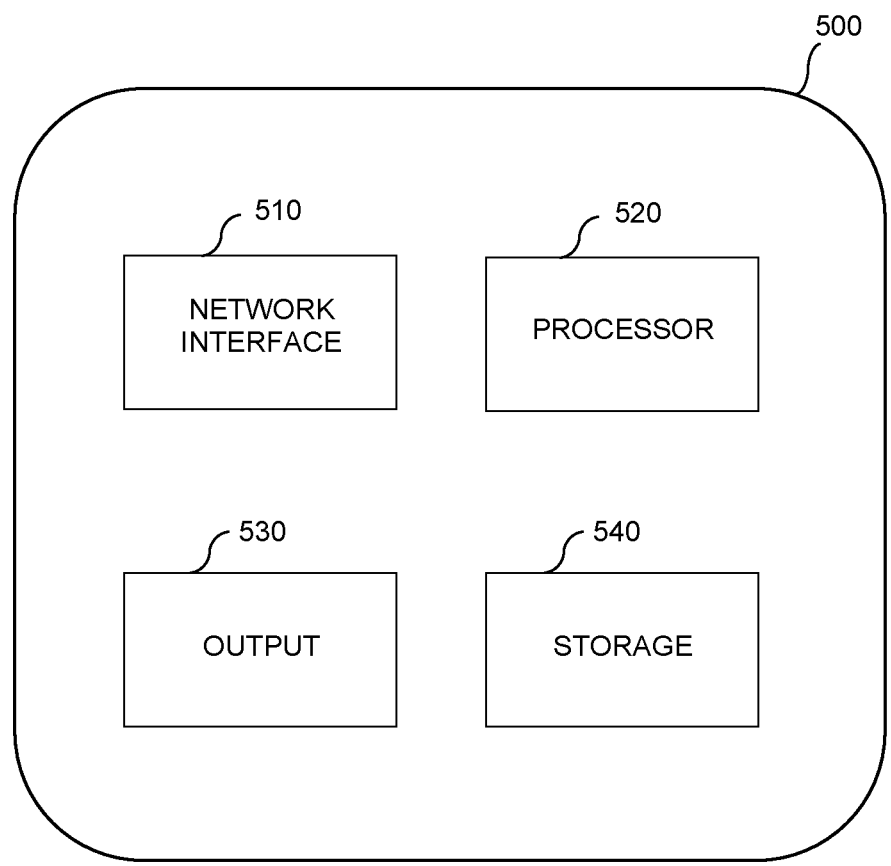
FIG. 5 is a diagram illustrating a device for facilitating loyalty program enrollment in accordance with an example embodiment.

FIG. 5 illustrates a device 500 for facilitating loyalty program enrollment in accordance with an example embodiment. For example, the device 500 may be the wallet providing server 130 of FIG. 1, or another device. Also, the device 500 may perform the method of FIG. 4. Referring to FIG. 5, the device 500 includes a network interface 510, a processor 520, an output 530, and a storage device 540. Although not shown in FIG. 5, the device 500 may include other components such as a display, an input unit, a receiver/transmitter, and the like. Also, the network interface 510 may also be referred to as a transmitter, a receiver, a transmitter, and/or the like. The network interface 510 may transmit and receive data over a network such as the Internet, a private network, a public network, etc. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the device 500, an externally connected display, a cloud, another device, and the like. The storage device 540 is not limited to any particular storage device and may include any known memory device such as RAM, ROM, hard disk, and the like.

According to various embodiments, the storage 540 may store data about existing digital wallet users, for example, sensitive information such as personal information, contact information, employment information, credit information, and the like. The network interface 510 may receive, from a merchant server, a request to enroll a digital wallet user in a merchant loyalty program. For example, the request may be input via a merchant website associated with the merchant server or from a merchant terminal (e.g., a kiosk, point of sale, etc.) connected to the merchant server. The processor 520 may verify that the digital wallet user is an authorized user of the digital wallet via a window associated with the merchant website. Here, the processor 520 may perform authorization and authentication of the user by requesting information from the user. For example, the processor 520 may display a window such as shown in FIG. 2 in association with the merchant website and receive user information from inputs via the window. In some examples, the information may be captured by the digital wallet provider without passing through or being stored by the merchant server hosting the merchant website.

In response to the processor 520 verifying the digital wallet user is an authorized user, the processor 520 may control the network interface 510 to automatically transmit previously stored secure information of the digital wallet stored in the storage 540 to the merchant server for enrolling the digital wallet user in the merchant loyalty program. For example, the processor 520 may identify all user information needed for enrollment in the merchant loyalty program that is stored at the digital wallet providing server and control the network interface 510 to transmit all the identified information to the merchant server. As another example, the processor 520 may identify as much information as the storage 540 has stored therein that can be used to enroll in the merchant loyalty program even in situations where additional information is needed. In this example, the merchant server may further request information from the user to supplement the information provided by the wallet providing device 500.

FIG. 6 illustrates a method 600 for facilitating loyalty program enrollment in accordance with another example embodiment. For example, the method 600 may be performed by the merchant server 120 shown in FIG. 1, or another device. Referring to FIG. 6, in 610, the method includes receiving, at the merchant server, a request to enroll in a merchant loyalty program. The request may be from a digital wallet user who is attempting to make a purchase via a merchant website hosted by the merchant server. For example, the request may be automatically detected by the merchant server, for example, when the user chooses a digital wallet as a payment option. As another example, the merchant server may provide an option within the merchant website for a user to select, such as a radio button, a drop-down box, and the like. For example, the merchant server may embed a selection within the merchant website enabling a user of the merchant website to choose to enroll in the merchant loyalty program using a digital wallet by activating the selection.

According to various embodiments, a digital wallet provider may perform an authorization and an authentication of the digital wallet user and provide an indication of the successful authorization/authentication to the merchant server. For example, the merchant server may query the digital wallet provider or the digital wallet provider may automatically provide a notification of the successful authorization/authentication to the merchant server. As another example, the wallet provider may provide notification of a failure in the authorization or authentication process. In response to the user of the digital wallet being successfully verified as an authorized user by a digital wallet provider, in 620 the merchant server may automatically receive secure information of the digital wallet previously stored by the digital wallet providing server. For example, the merchant server may receive user information stored at the digital wallet providing server that is needed for enrolling the digital wallet user in the merchant loyalty program such as personal information, credit history information, financial information, contact information, usernames, passwords, security questions, and the like.

In 630, the method includes enrolling the user of the digital wallet in the merchant loyalty program based on the secure information of the digital wallet that is automatically received from the digital wallet providing server. Furthermore, once the user is enrolled in the merchant loyalty program, the merchant server may transmit and receive information to and from the user according to the merchant loyalty program. For example, the merchant server may provide the user with offers, discounts, rewards, and other incentives, based on user spending.

The example embodiments provide a system and method for attacking the barrier to loyalty program enrollment by leveraging pre-loaded data of a user that is already stored at a digital wallet providing server. For example, the system and methods herein may directly import data from a digital wallet (e.g., personal information, contact information, etc.) into a server controlling the enrollment in the merchant loyalty program thereby relieving the user from entering any information during an enrollment process or reducing the amount of information needed to be input during the enrollment process such as such as a username, password, security questions, or the like.

As used herein and in the appended claims, the term "payment card account" includes a credit card account, a deposit account that the account holder may access using a debit card, a prepaid card account, or any other type of account from which payment transactions may be consummated. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" or "payment system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

As used herein, the term account may refer to a card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like, and also refer to any suitable payment account such as a deposit account, bank account, credit account, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
receiving, by a wallet providing server, a request to enroll a digital wallet user in a merchant loyalty program hosted by a merchant server;
displaying, by the wallet providing server, a verification window on a screen of a user device in association with a display of a merchant website on the screen which is hosted by the merchant server;
determining, via the wallet providing server, that the digital wallet user is an authorized user of the digital wallet based on an input received via the independently displayed verification window;
identifying, by the wallet providing server, enrollment information for the merchant loyalty program based on requirements of a loyalty enrollment application;
establishing a secure communications channel between the wallet providing server displaying the verification window on the screen and a merchant loyalty program host server of a merchant displaying the merchant website on the screen; and
in response to verifying the digital wallet user via the independently displayed verification window, automatically and directly importing, by the wallet providing server to the merchant loyalty program host server via the secure communications channel, previously stored information of the digital wallet user stored at the wallet providing server which matches the identified enrollment information of the loyalty enrollment application.

2. The method of claim 1, wherein the merchant loyalty program comprises a rewards program of a merchant corresponding to the merchant server.

3. The method of claim 1, wherein the automatically and directly importing comprises identifying all user information needed for enrollment in the merchant loyalty program that is stored at the wallet providing server and automatically transmitting the identified information to the merchant server.

4. The method of claim 1, wherein the previously stored information of the digital wallet that is transmitted to the merchant server comprises personal information of the digital wallet user, financial information of the digital wallet user, and contact information of the digital wallet user.

5. The method of claim 1, wherein the previously stored information of the digital wallet user is automatically transmitted over a secured channel between the merchant server and the wallet providing server.

6. The method of claim 1, wherein the displaying comprises overlaying the verification window on top of a window displaying the payment process on the merchant website, and the overlayed verification window comprises fields for inputting authorization verification information.

7. The method of claim 6, wherein the overlayed verification window comprises a lightbox that is securely controlled by the wallet providing server such that data input via the user device within the lightbox is not received by nor does it pass through the merchant server.

8. The method of claim 1, wherein the received input for verifying the digital wallet user comprises a PIN number entered into the verification window.

9. The method of claim 1, wherein the received input for verifying the digital wallet user comprises biometric information of the digital wallet user captured by the verification window.

10. A digital wallet providing server comprising:
a receiver configured to receive, from a merchant server, a request to enroll a digital wallet user in a merchant loyalty program hosted by the merchant server;
a processor configured to
display a verification window on a screen of a user device in association with a display of a merchant website on the screen which hosted by the merchant server,
determine that the digital wallet user is an authorized user of the digital wallet based on an input received via the independently displayed verification window,
identify enrollment information for the merchant loyalty program based on requirements of a loyalty enrollment application;
establish a secure communications channel between the digital wallet providing server displaying the verification window on the screen and a merchant loyalty program host server of a merchant displaying the merchant website on the screen; and
a transmitter configured to automatically and directly import, via the secure communications channel, previously stored information of the digital wallet user stored at the digital wallet providing server to the merchant loyalty program host server which matches the identified enrollment information of the loyalty enrollment application, in response to verifying the digital wallet user via the independently displayed verification window.

11. The digital wallet provider server of claim 10, wherein the merchant loyalty program comprises a rewards program of a merchant corresponding to the merchant server.

12. The digital wallet provider server of claim 10, wherein the processor is configured to identify all user information needed for enrollment in the merchant loyalty program that is stored at the digital wallet providing server and the transmitter is configured to automatically and directly import the identified information to the merchant server.

13. The digital wallet provider server of claim 10, wherein the previously stored information of the digital wallet comprises personal information of the digital wallet user, financial information of the digital wallet user, and contact information of the digital wallet user.

14. The digital wallet provider server of claim 10, wherein the transmitter transmits the previously stored information of the digital wallet user to the merchant server via a secure channel between the merchant server and the digital wallet providing server.

15. The digital wallet provider server of claim 10, wherein the processor is configured to overlay the verification window for verifying the digital wallet user on top of a window displaying the payment process on the merchant website, and the overlayed verification window comprises fields for inputting authorization verification information.

16. The digital wallet provider server of claim 15, wherein the overlayed verification window comprises a lightbox that is securely controlled by the digital wallet providing server such that information input within the lightbox is not received and not stored by the merchant server.

17. A method comprising:
receiving, at a merchant server, a request to enroll in a merchant loyalty program, the request being associated with a user of a digital wallet;
in response to the enrollment request, triggering a digital wallet providing server to authenticate the digital wallet user via an independent window that is separately displayed in association with a display of a merchant website;
establishing a secure communications channel between the digital wallet providing server displaying the verification window and the merchant of a merchant displaying the merchant website;
importing, at the merchant server from the digital wallet providing server, enrollment information of the digital wallet user previously stored by the digital wallet providing server which matches information required for a loyalty enrollment application of the merchant loyalty program; and
enrolling, at the merchant server, the digital wallet user in the merchant loyalty program based on the enrollment information of the digital wallet user that is imported from the digital wallet providing server.

18. The method of claim 17, wherein the importing comprises receiving all user information stored at the digital wallet providing server that is needed for enrolling the digital wallet user in the merchant loyalty program.

19. The method of claim 17, wherein the previously stored information of the digital wallet that is received by the merchant server comprises personal information of the digital wallet user, financial information of the digital wallet user, and contact information of the digital wallet user.

20. The method of claim 17, wherein the method further comprises embedding a selection within the payment process performed via the merchant website enabling a user of the merchant website to choose to enroll in the merchant loyalty program using a digital wallet.

21. The method of claim 17, wherein the merchant server auto-detects selection of a payment card that is included within a digital wallet via the merchant website, and in response, the merchant server launches a selection on the merchant website enabling the user to enroll in the merchant loyalty program.

22. The method of claim 1, wherein the automatically importing is automatically initiated by the wallet providing server in response to successful authentication of the digital wallet user via the independently displayed verification window.

\* \* \* \* \*